United States Patent
Yu et al.

(10) Patent No.: US 11,063,534 B2
(45) Date of Patent: Jul. 13, 2021

(54) BIDIRECTIONAL UNIVERSAL POWER CONVERTER AND CONTROL METHOD

(71) Applicant: North Carolina State University, Raleigh, NC (US)

(72) Inventors: Wensong Yu, Raleigh, NC (US); Iqbal Husain, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 22 days.

(21) Appl. No.: 16/524,333

(22) Filed: Jul. 29, 2019

(65) Prior Publication Data

US 2020/0067424 A1  Feb. 27, 2020

Related U.S. Application Data

(60) Provisional application No. 62/720,191, filed on Aug. 21, 2018.

(51) Int. Cl.
*H02M 7/797* (2006.01)
*H02M 1/088* (2006.01)
*H02M 1/08* (2006.01)
*H02M 1/00* (2006.01)

(52) U.S. Cl.
CPC .......... *H02M 7/797* (2013.01); *H02M 1/083* (2013.01); *H02M 1/088* (2013.01); *H02M 2001/0058* (2013.01)

(58) Field of Classification Search
CPC ...... H02M 7/797; H02M 1/083; H02M 1/088; H02M 2001/0058
See application file for complete search history.

(56) References Cited

U.S. PATENT DOCUMENTS

| | | | | |
|---|---|---|---|---|
| 7,768,800 B2* | 8/2010 | Mazumder | .......... | H02M 7/5387 363/17 |
| 8,559,193 B2* | 10/2013 | Mazumder | .......... | H02M 7/4807 363/8 |
| 2012/0170341 A1* | 7/2012 | Fornage | .............. | H02M 7/5387 363/132 |
| 2016/0094141 A1* | 3/2016 | Petkov | .................. | H02M 5/225 323/205 |

OTHER PUBLICATIONS

S. Deng, H. Mao, J. Mazumder, I. Batarseh, and K. Islam, "A new control scheme for high frequency link inverter design," in IEEE Applied Power Electronics Conference, pp. 512-517, 2003 (Year: 2003).*

* cited by examiner

*Primary Examiner* — Kyle J Moody
*Assistant Examiner* — Jye-June Lee
(74) *Attorney, Agent, or Firm* — NK Patent Law

(57) ABSTRACT

Disclosed herein are methods, systems, and devices for providing power conversion between a direct current (DC) source and an alternating current (AC) power grid. According to one embodiment, a power converter device includes a transformer having a first winding and a second winding. The power converter device further includes zero voltage switch circuitry and zero current switch circuitry. The zero voltage switch circuitry is electrically coupled to the first winding, and configured to be electrically coupled to a DC voltage source via a first port and a second port. The zero current switch circuitry is electrically coupled to the second winding of the transformer and configured to be electrically coupled with an AC power grid.

20 Claims, 10 Drawing Sheets

BIDIRECTIONAL UNIVERSAL POWER CONVERTER AND CONTROL METHOD

PRIORITY CLAIM

This application claims priority to U.S. Provisional Patent Application Ser. No. 62/720,191 filed Aug. 21, 2018, the disclosure of which is incorporated herein by reference in its entirety.

TECHNICAL FIELD

The present invention relates generally to the field of power converters in power generation systems. More particularly, systems and devices are disclosed for coupling a direct current (DC) source or load to an alternating current (AC) power grid or load.

BACKGROUND

Sources of electrical power continue to grow for both consumer and industrial applications. In addition to steam turbine power generation for supplying alternating current (AC) power grids, solar and wind farms are low cost and eco-friendly solutions for providing supplemental power to these AC power grids. Solar panels and many wind turbines supply direct current (DC) power that must be converted to AC power and frequency synchronized when coupled with an AC power grid.

Additionally, many consumer and industrial applications now employ an uninterruptible power system (UPS) containing batteries to maintain a stable source of power. The UPS must use AC-to-DC power conversion for charging the batteries during normal AC power grid operation and DC-to-AC power conversion for supplying AC power from the batteries during an AC power grid failure.

Accordingly, there remains a need for further contributions in the technologies for AC-to-DC power conversion and DC-to-AC power conversion. These contributions may include simpler methods of achieving high voltage and low distortion power converters capable of bidirectional power conversion, variable frequency, high efficiency, and low electromagnetic interference.

SUMMARY

Disclosed herein are methods, systems, and devices for providing power conversion between a direct current (DC) source or load and an alternating current (AC) power grid or load.

According to one embodiment, a power converter device includes a transformer having a first winding and a second winding. The power converter device further includes zero voltage switch circuitry and zero current switch circuitry. The zero voltage switch circuitry is electrically coupled to the first winding, and configured to be electrically coupled to a DC voltage source via a first port and a second port. The zero current switch circuitry is electrically coupled to the second winding of the transformer and configured to be electrically coupled with an AC power grid. The DC source may be a medium voltage direct current (MVDV) source and may be provided by at least one wind turbine. In other embodiments, the DC source may be provided by at least one solar panel.

In some embodiments, the AC power grid may be a three-phase AC power grid. The zero current switch circuitry may be further configured to be electrically coupled with the AC power grid via a third port, a fourth port, and a fifth port. The third port may be configured to be electrically coupled with a first phase hot wire of the AC power grid; the fourth port may be configured to be electrically coupled with a second phase hot wire of the AC power grid, and the fifth port may be configured to be electrically coupled with a third phase hot wire of the AC power grid.

In some embodiments, the transformer may further include a first tap electrically coupled with the first winding and a second tap electrically coupled with the first winding. The zero voltage switch circuitry may include a first transistor switch circuit electrically coupled between the first tap and the first port, and a second transistor switch circuit electrically coupled between the first tap and the second port. A first capacitor may be electrically coupled between the first port and the second tap, and a second capacitor may be electrically coupled between the second port and the second tap. The transformer may also include a third tap electrically coupled with the second winding, a fourth tap electrically coupled with the second winding, and a fifth tap electrically coupled with the second winding. The fifth tap may be a center tap configured to be electrically coupled with an earth ground of the AC power grid.

In some embodiments, the zero current switch circuitry may include a third transistor switch circuit electrically coupled between the third tap and the third port, a fourth transistor switch circuit electrically coupled between the third tap and the fourth port, and a fifth transistor switch circuit electrically coupled between the third tap and the fifth port, a sixth transistor switch circuit electrically coupled between the fourth tap and the third port, a seventh transistor switch circuit electrically coupled between the fourth tap and the fourth port, and an eighth transistor switch circuit electrically coupled between the fourth tap and the fifth port.

In some embodiments, the transformer may be designed for a circuit specific leakage inductance and designed for a circuit specific magnetizing inductance. The first winding and the second winding may also be galvanically isolated. The transformer may further include a center tap coupled with the second winding. The power converter device may further include a sixth port electrically coupled with the center tap and configured to be electrically coupled with an earth ground of the AC power grid. The transformer may further include a third winding electrically coupled between the first tap and the second tap.

In some embodiments, the first and second transistor circuits may each comprise a high voltage (HV) silicon carbide (SiC) based N-channel metal-oxide-semiconductor field-effect transistor (MOSFET). The third through eighth transistor circuits may also each include a plurality of HV SiC based N-channel MOSFETs and each plurality forming a cascode, three-level, or other multilevel circuit. The power converter device may further include control circuitry electrically coupled with a gate of each HV SiC based N-channel MOSFET.

In some embodiments, the control circuitry may be electrically coupled with the zero voltage switch circuitry and the zero current switch circuitry. The control circuitry may include a first gating generator circuit configured to provide gate voltages to the zero voltage switch circuitry, a second gating generator circuit electrically coupled with the first gating generator circuit and configured to provide gate voltages to the zero current switch circuitry, and a bidirectional phase shifted modulator circuit electrically coupled with the second gating generator circuit. The first gating generator circuit may be further configured to provide voltage polarity information to the second gating generator circuit and to provide gate voltages to the zero voltage switch circuitry. In certain embodiments, the control circuitry may be implemented in a processor. The processor may include a computer readable storage medium for storing program instructions.

In some embodiments, the DC source may provide a DC voltage between approximately 48 volts and approximately 8000 volts. In other embodiments, the DC source may provide a DC voltage between approximately 12 volts and approximately 24 volts. The DC source may be provided by at least one battery. The power converter device may also be implemented within an uninterruptible power system (UPS).

In other embodiments, the AC power grid may be a single-phase AC power grid and the zero current switch circuitry may be further configured to be electrically coupled with the AC power grid via a third port and a fourth port. The third port may be configured to be electrically coupled with a hot wire of the AC power grid and the fourth port may be configured to be electrically coupled with a neutral wire of the AC power grid.

In other embodiments, the AC power grid may be a two-phase AC power grid and the zero current switch circuitry may be further configured to be electrically coupled with the AC power grid via a third port, a fourth port, and fifth port. The third port may be configured to be electrically coupled with a first phase hot wire of the AC power grid, the fourth port may be configured to be electrically coupled with a second phase hot wire of the AC power grid, and the fifth port may configured to be electrically coupled with a neutral wire of the AC power grid.

In some embodiments, the zero current switch circuitry may be configured to transfer power from the transformer to the AC power grid without using a diode. The zero current switch circuitry may also be configured to transfer power from the AC power grid to the transformer without using a diode.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings.

DETAILED DESCRIPTION

Figure 1:
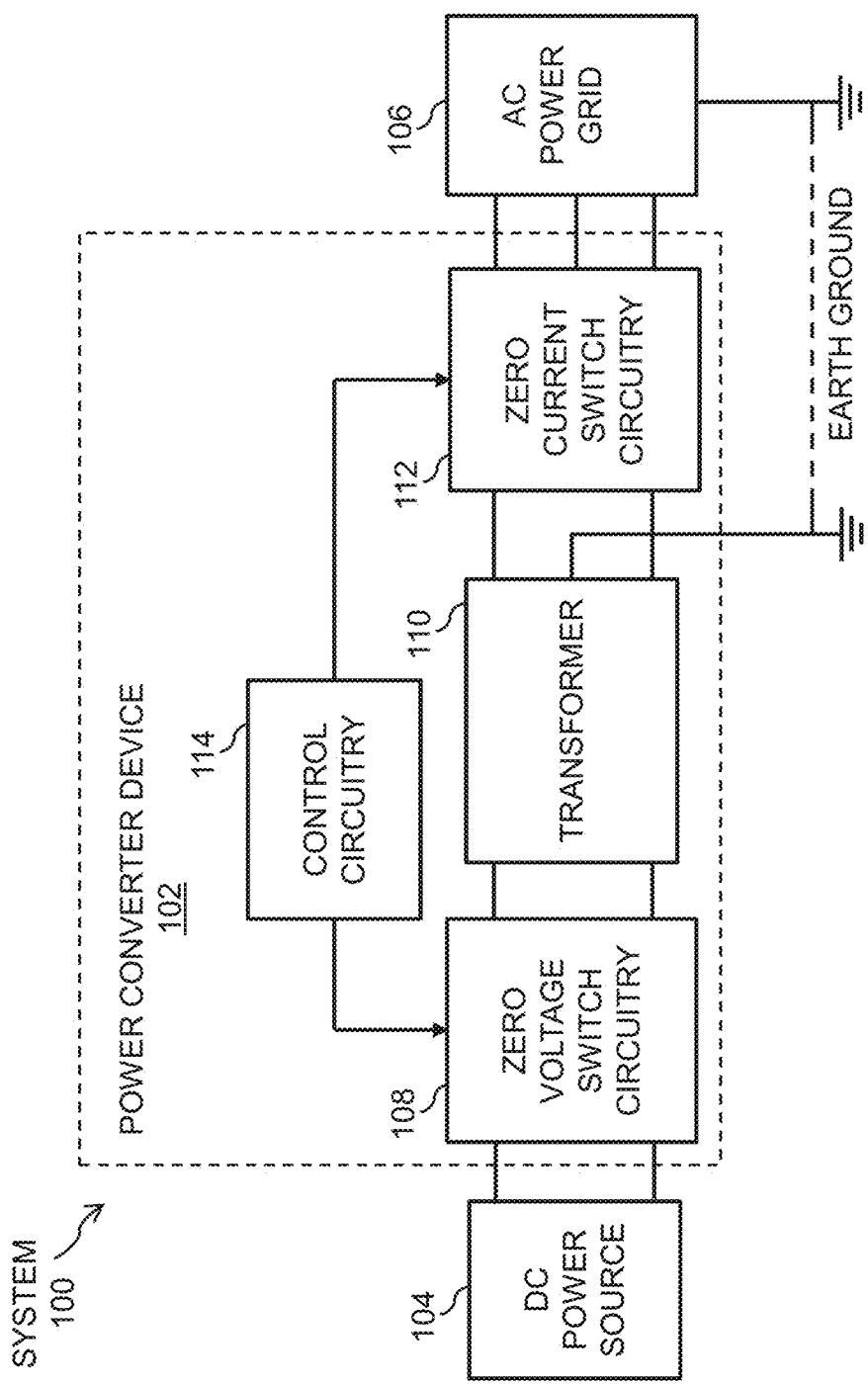
FIG. 1 depicts a block diagram illustrating a system including a power converter device for coupling a direct current (DC) source to an alternating current (AC) power grid in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Disclosed herein are methods, devices, and systems for power conversion between a direct current (DC) source and an alternating current (AC) power grid, wherein use of one of more diodes is not required for the power conversion.

FIG. 1 depicts a block diagram illustrating a system 100 including a power converter device 102 for coupling a direct current (DC) source 104 to an alternating current (AC) power grid 106 in accordance with embodiments of the present disclosure. The power converter device 102 includes zero voltage switch circuitry 108, a transformer 110, zero current switch circuitry 112, and control circuitry 114. In some embodiments, the power converter device 102 may be configured to provide power from the DC source 104 to the AC power grid. In other embodiments, the power converter device 102 may be configured to provide power from the AC power grid 106 to the DC source 104. In some embodiments the DC source 104 may be a medium voltage direct current (MVDC) source electrically coupled to one or more wind turbines in a wind farm. In other embodiments, the MVDC source may be electrically coupled with one or more solar panels in a solar farm. The MVDC source may be between 1 kilovolt (kV) and 40 kV. In other embodiments, the DC source 104 may be one or more batteries. The one or more batteries and the power converter device 102 may be implemented within an uninterruptible power system (UPS). The one or more batteries may be configured to nominally supply 6, 12, 24, or 48 volts. The power converter device 102 may be used to supply the AC power grid 106 during a power failure and/or may be used to charge one or more batteries during normal operation. The zero current switch circuitry may be configured to transfer power without using one or more diodes.

The zero voltage switch circuitry 108 is electrically coupled between the DC power source 104 and the transformer 110. The zero current switch circuitry 112 is electrically coupled between the transformer 110 and the AC power grid 106. The control circuitry 114 is electrically coupled with the zero voltage switch circuitry 108 and the zero current switch circuitry 112. The control circuitry 114 is configured to provide timing signals associated with zero voltage switching and zero current switching. The transformer 110 and the AC power grid 106 are electrically coupled with an earth ground. Zero voltage switching provides an efficient method of supplying a pulse width modulated (PWM) waveform to the transformer 110.

In some embodiments, the AC power grid 106 may be a three-phase AC power grid. The three-phase AC power grid may be configured to operate at voltages greater than 35 kV. In other embodiments, the three-phase AC power grid may be configured to operate at voltages between 4 kV and 35 kV phase-to-phase. The AC power grid 106 may be configured to operate at a frequency of 50 Hertz (Hz) or 60 Hz. In other embodiments, the AC power grid 106 may be single phase AC power grid or a two phase AC power grid. The AC power grid may be a 7.2 kV, a 120 volt, or a 240 single phase AC power grid.

Figure 2:
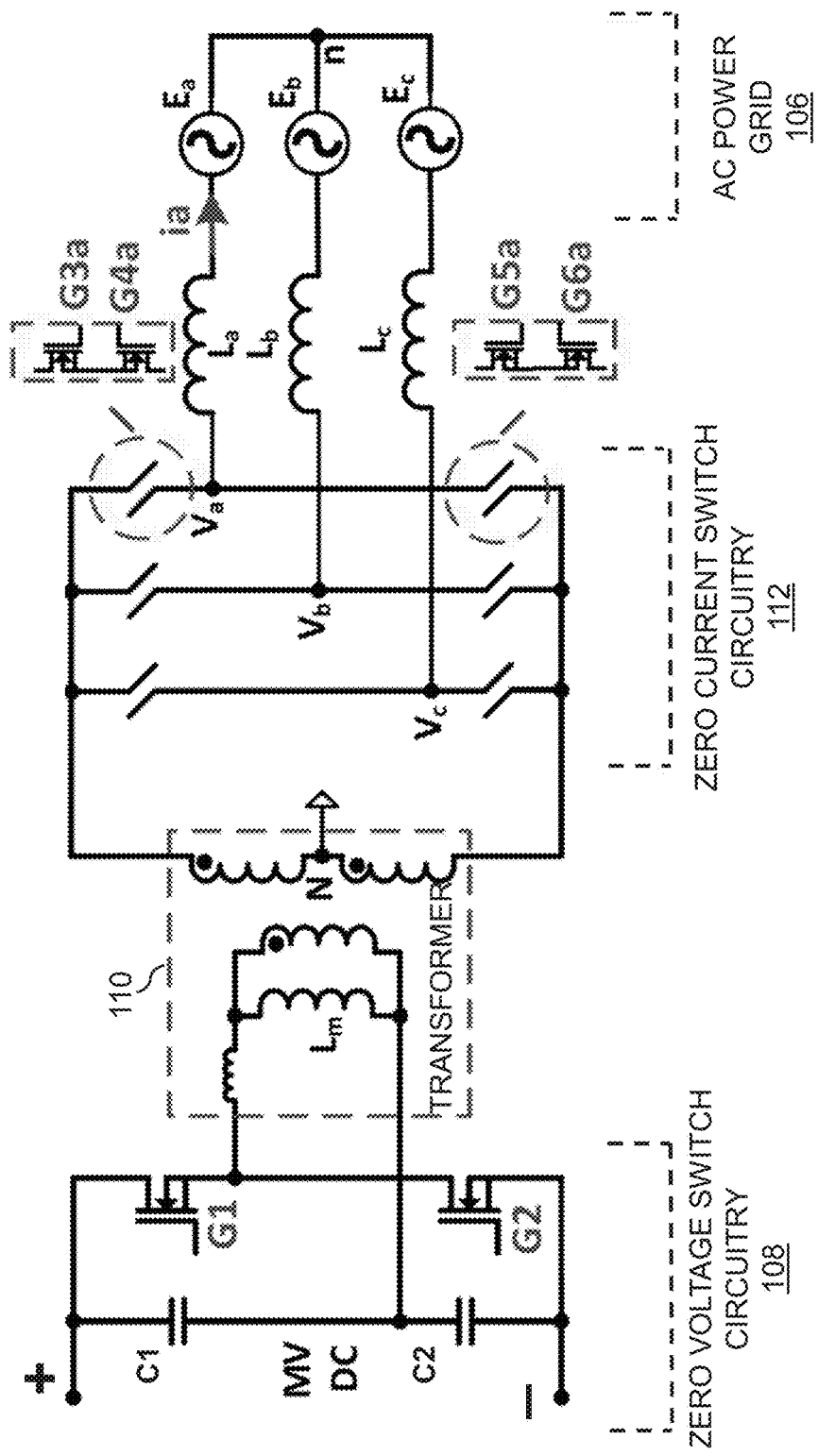
FIG. 2 depicts a circuit diagram illustrating zero voltage switch circuitry, a transformer, and zero current switch circuitry included in the power converter device in accordance with embodiments of the present disclosure.

FIG. 2 depicts a circuit diagram 200 illustrating the zero voltage switch circuitry 108, the transformer 110, and the zero current switch circuitry 112 included in the power converter device 102 of FIG. 1 in accordance with embodiments of the present disclosure. The zero voltage switch circuitry 108 is coupled with a medium voltage direct current (MVDC) source via a positive (+) voltage port and a negative (−) voltage port.

The zero voltage switch circuitry 108 includes a transistor G1 electrically coupled between the positive voltage port and a first tap of the transformer 110, and a transistor G2 electrically coupled between the negative voltage port and the first tap of the transformer 110. In some embodiments, transistors G1 and G2 may be high voltage (HV) silicon carbide (SiC) based N-channel metal-oxide-semiconductor field-effect transistors (MOSFETs). A capacitor C1 is electrically coupled between the positive voltage port and a second tap of the transformer 110. A capacitor C2 is electrically coupled between the negative voltage port and the second tap of the transformer 110. The transformer 100 is an LLC transformer. Capacitor C1, capacitor C2, and transformer 110 are configured to provide LLC resonant power conversion.

The zero current switch circuitry 112 includes transistors G3a and G4a in a cascode, three-level, or other multilevel configuration coupled between a third tap of the transformer 110 and a first phase Va of the AC power grid 106. The zero current switch circuitry 112 also includes transistors G5a and G6a in a cascode, three-level, or other multilevel configuration coupled between a fourth tap of the transformer 110 and the first phase Va of the AC power grid 106. A fifth tap (i.e. center tap) of the transformer 110 is electrically coupled with an earth ground associated with the AC power grid 106. Similar cascode, three-level, or other multilevel transistor circuits (i.e. transistors G3b-G6b and G3c-G6c not labeled in FIG. 2) electrically couple a second phase Vb and a third phase Vc of the AC power grid 106 with fourth and fifth taps of the transformer 110. The cascode arrangement reduces drain-source capacitance and improves bandwidth of the zero current switch circuitry 112. In some embodiments, transistors G3a, G4a, G5a, and G6a may also be HV SiC based N-channel MOSFETs.

Figure 3:
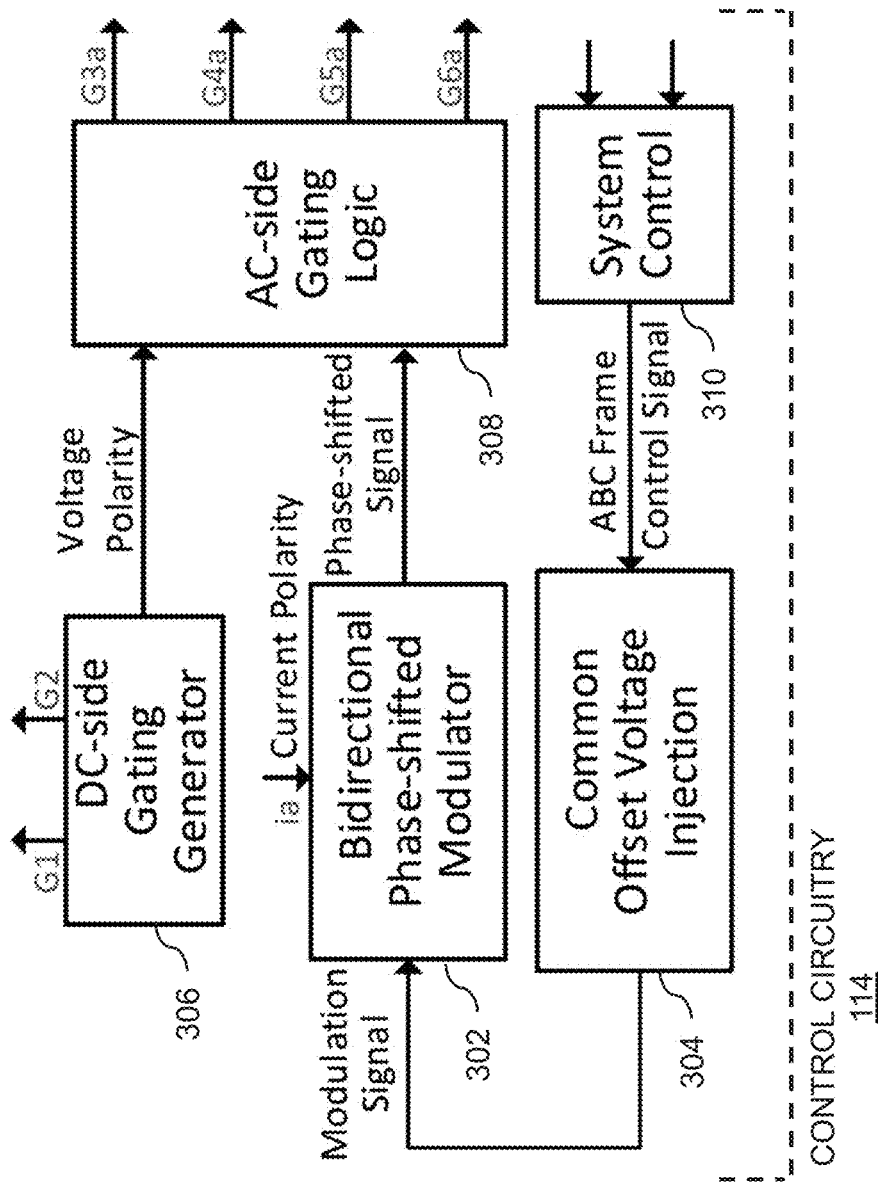
FIG. 3 depicts a block diagram illustrating control circuitry included in the power converter device in accordance with embodiments of the present disclosure.

FIG. 3 depicts a block diagram 300 illustrating the control circuitry 114 included in the power converter device 102 of FIG. 1 in accordance with embodiments of the present disclosure. The control circuitry 114 includes a bidirectional phase-shifted modulator circuit 302, a common offset voltage injection function 304, a DC-side gating generator 306, an AC-side gating logic function 308, and a system control function 310. The system control function 310 is configured to receive the feedback and feedforward signals from circuitries of 108 and 112 included in the power converter device 102 of FIG. 1. The system control function 310 is further configured to provide the control signal in the ABC frame of reference to the common offset voltage injection function 304. The common offset voltage injection function 304 is configured to provide a modulation signal to the bidirectional phase-shifted modulator circuit 302.

The bidirectional phase-shifted modulator circuit 302 is configured to receive a current polarity signal (ia) from a first phase Va of the AC power grid 106 and provide a phase-shifted signal to the AC-side gating logic function 308. The AC-side gating logic function 308 is configured to provide gate control voltages to the cascode, three-level, or other multilevel circuits of the zero current switch circuitry 112 of FIG. 2. As example the gate control voltages G3a-G6a for phase A of the AC power grid 106 as shown in FIG.

2. The DC-side gating generator circuit 306 is configured to provide gate control voltages G1 and G2 to the gates of transistor G1 and G2 of the zero voltage switch circuitry 112 of FIG. 2. The DC-side gating generator circuit 306 is also configured to provide a voltage polarity signal to the AC-side gating logic function 308.

In some embodiments, at least a portion of the control circuitry 114 may be implemented in a processor including a computer readable storage medium for storing program instructions. The processor may be a microcontroller or digital signal processor, or the like. In other embodiments, the processor may be a field-programmable gate array (FPGA), an application-specific integrated circuit (ASIC), or the like.

Figure 4:
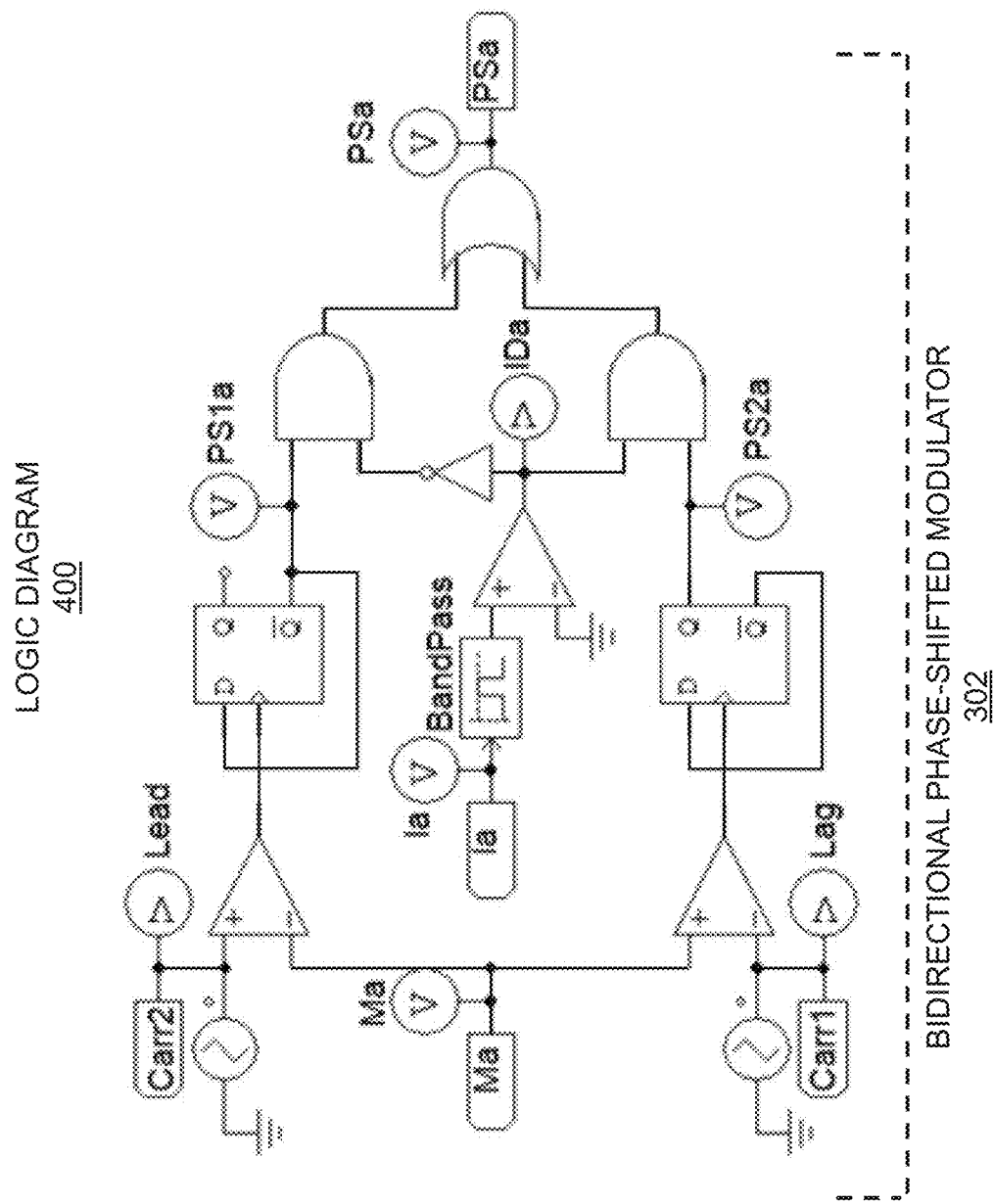
FIG. 4 depicts a logic diagram illustrating a bidirectional phase-shifter modulator included in the control circuitry in accordance with embodiments of the present disclosure.

FIG. 4 depicts a logic diagram 400 illustrating the bidirectional phase-shifter modulator 302 included in the control circuitry 114 of FIG. 3 in accordance with embodiments of the present disclosure. The shifted phase is proportional to modulation signal and the direction of leading or lagging phase is determined by the individual phase current. The bidirectional phase-shifter modulator 302 is configured to receive the modulation signal Ma from the common offset voltage injection function 304 and further configured to provide a phase-shifted signal PSa to the AC-side gating logic function 308. The bidirectional phase-shifter modulator 302 is also configured to receive the modulation signals Ma, Mb, and Mc from the common offset voltage injection function 304 (shown in FIG. 6) and further configured to provide phase-shifted signals PSb and PSc to the AC-side gating logic function 308 (not shown in FIG. 4).

Figure 5:
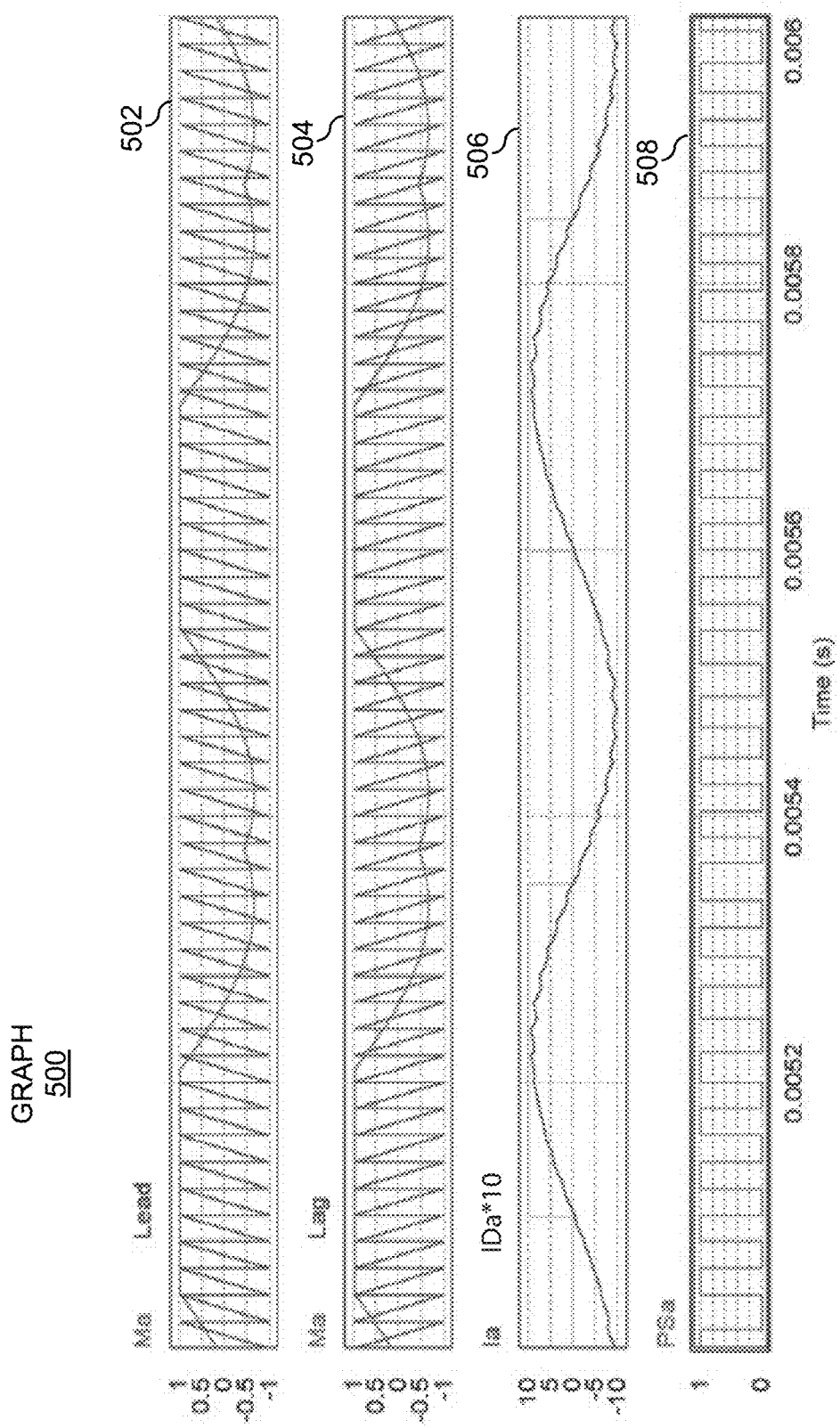
FIG. 5 depicts a graph illustrating waveforms associated with the bidirectional phase-shifter modulator in accordance with embodiments of the present disclosure.

FIG. 5 depicts a graph 500 illustrating waveforms 502-508 associated with the bidirectional phase-shifter modulator 302 of FIG. 4 over a six millisecond interval in accordance with embodiments of the present disclosure. Waveform 502 depicts the modulation signal Ma and the "lead" signal. Waveform 504 depicts the modulation signal Ma and the "lag" signal. Waveform 506 depicts the current Ia of the first phase Va of the AC power grid 106. Waveform 508 depicts the phase-shifted signal PSa.

Figure 6:
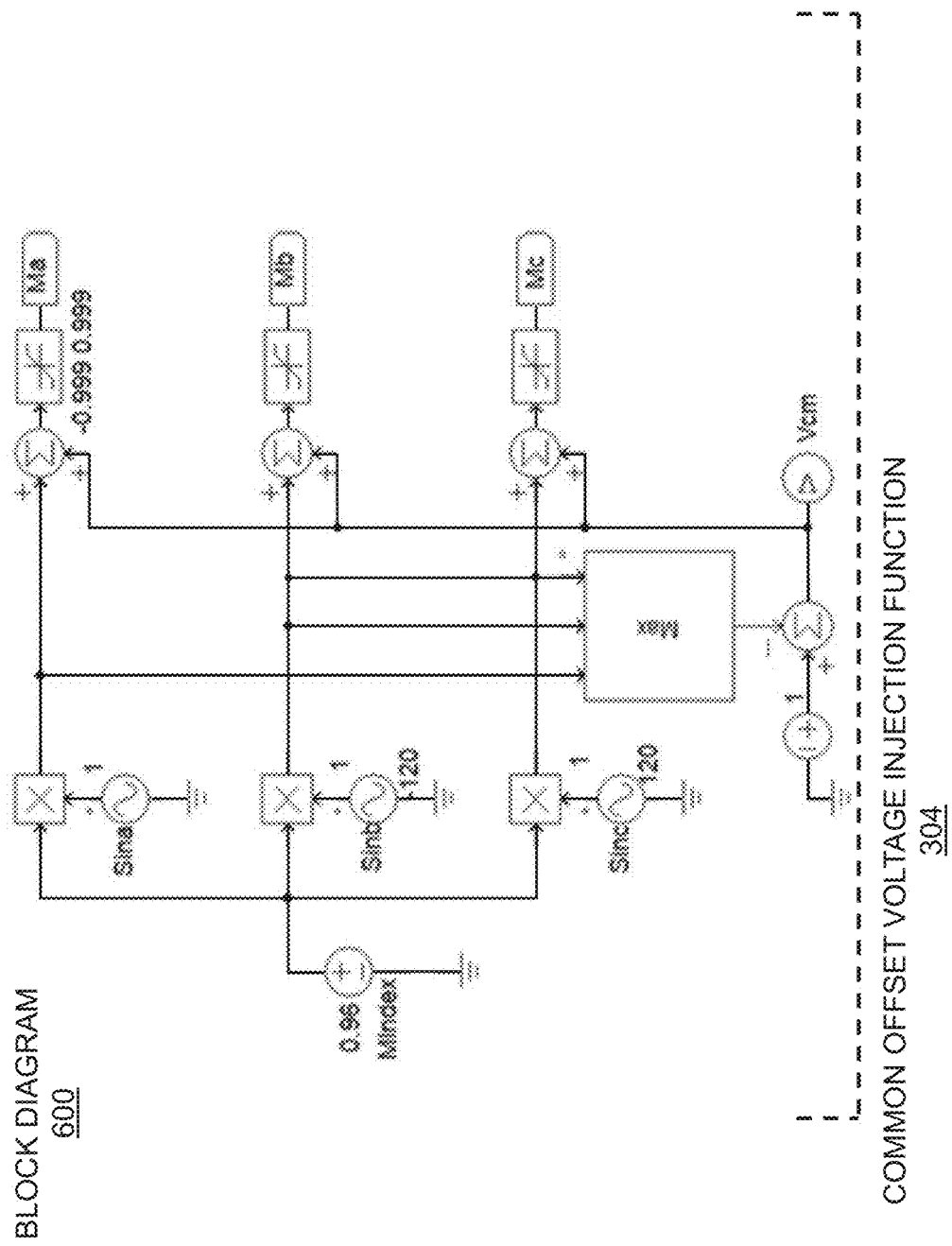
FIG. 6 depicts a block diagram illustrating a common offset voltage injection function included in the control circuitry in accordance with embodiments of the present disclosure.

FIG. 6 depicts a block diagram 600 illustrating the common offset voltage injection function 304 included in the control circuitry 114 of FIG. 3 in accordance with embodiments of the present disclosure. The common offset voltage injection function 304 is configured to receive ABC frame control signals Sina, Sinb, and Sinc from the system control. The common offset voltage injection function 304 is further configured to provide modulation signals Ma, Mb, and Mc to the bidirectional phase-shifter modulator 302 of FIG. 4.

Figure 7:
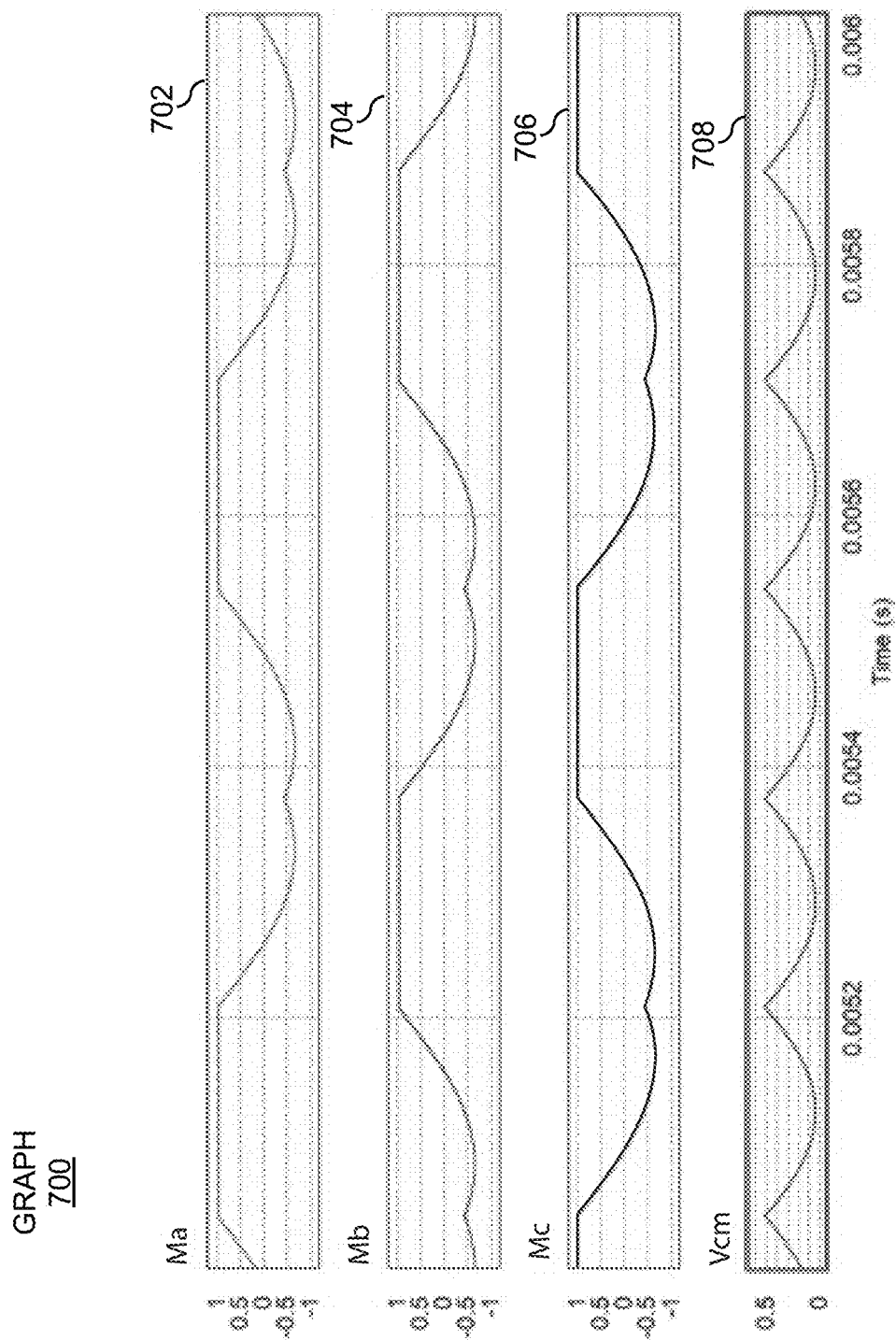
FIG. 7 depicts a graph illustrating waveforms associated with the common offset voltage injection function in accordance with embodiments of the present disclosure.

FIG. 7 depicts a graph 700 illustrating waveforms 702-708 associated with the common offset voltage injection function 304 of FIG. 6 over the same six millisecond interval of FIG. 5 in accordance with embodiments of the present disclosure. Waveforms 702, 704, and 705 depict the modulation signals Ma, Mb, and Mc provided to the bidirectional phase-shifter modulator 302 of FIG. 4. Waveform 708 depicts signal Vcm provided by the common offset voltage injection function 304.

Figure 8:
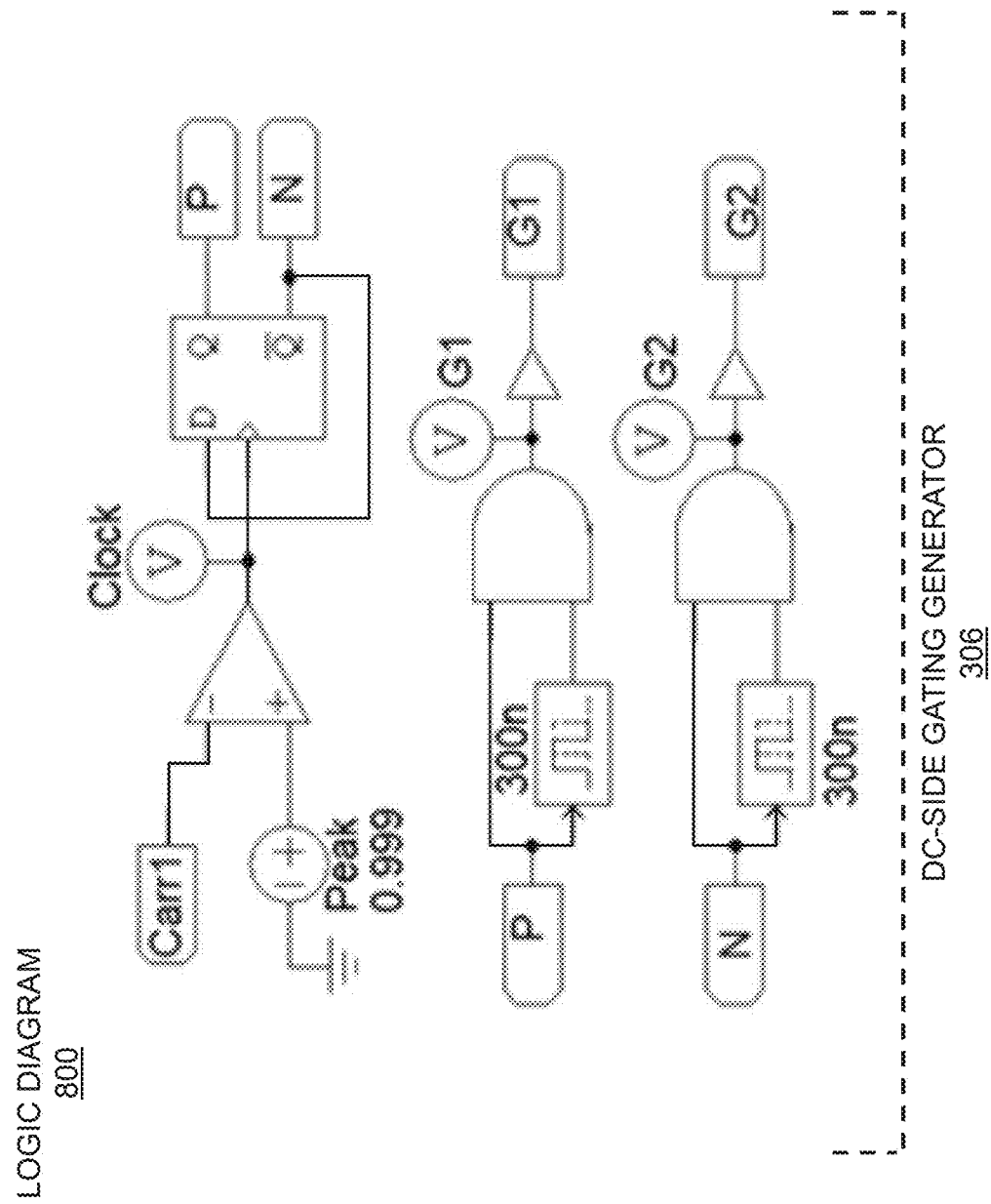
FIG. 8 depicts a logic diagram illustrating a direct current (DC) side gating generator included in the control circuitry in accordance with embodiments of the present disclosure.

FIG. 8 depicts a logic diagram 800 illustrating the DC side gating generator 306 included in the control circuitry 114 of FIG. 3 in accordance with embodiments of the present disclosure. The DC side gating generator 306 is configured for providing voltage polarity signals N and P to the AC side gating logic function 308 and providing gate control voltages for transistors G1 and G2 of the zero voltage switch circuitry 108.

Figure 9:
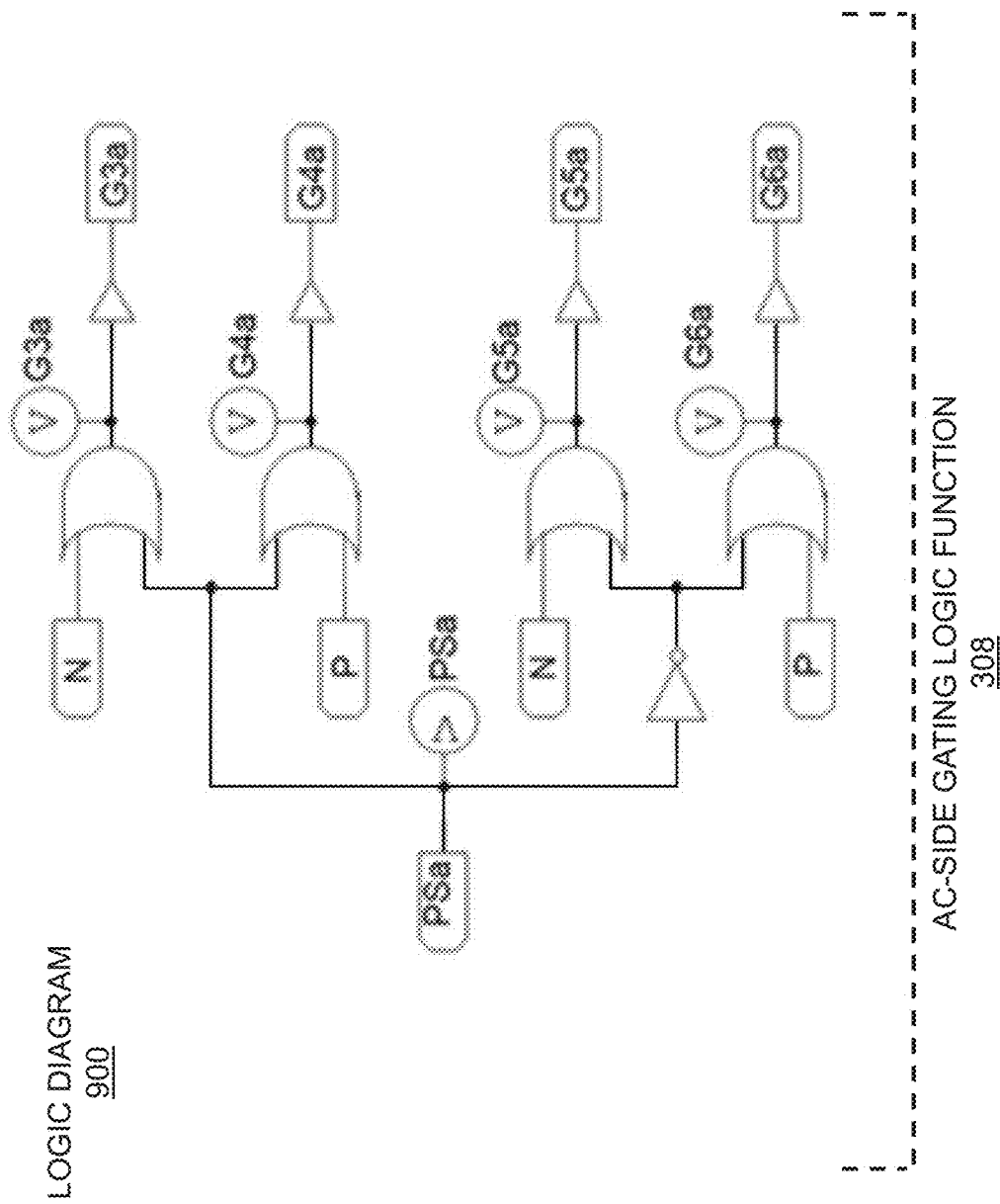
FIG. 9 depicts a logic diagram illustrating an alternating current (AC) side gating logic function included in the control circuitry in accordance with embodiments of the present disclosure.

FIG. 9 depicts a logic diagram 900 illustrating the AC side gating logic function 308 included in the control circuitry 114 of FIG. 3 over the same six millisecond interval of FIG. 5 and FIG. 7 in accordance with embodiments of the present disclosure. The AC side gating logic function 308 is configured for receiving the phase shifted signal PSa from the bidirectional phase-shifted modulator 302. The AC side gating logic function 308 is also configured for receiving the voltage polarity signals N and P from the DC side gating generator and further configured for providing the gate control voltages G3a-G6a for phase A of the AC power grid 106. The AC side gating logic function 308 is also configured for receiving phase shifted signals PSb and PSc from the bidirectional phase-shifted modulator 302, and providing gate control voltages G3b-G6b for phase B and gate control voltages G3c-G6c for phase B of the AC power grid 106 (not shown in FIG. 9)

Figure 10:
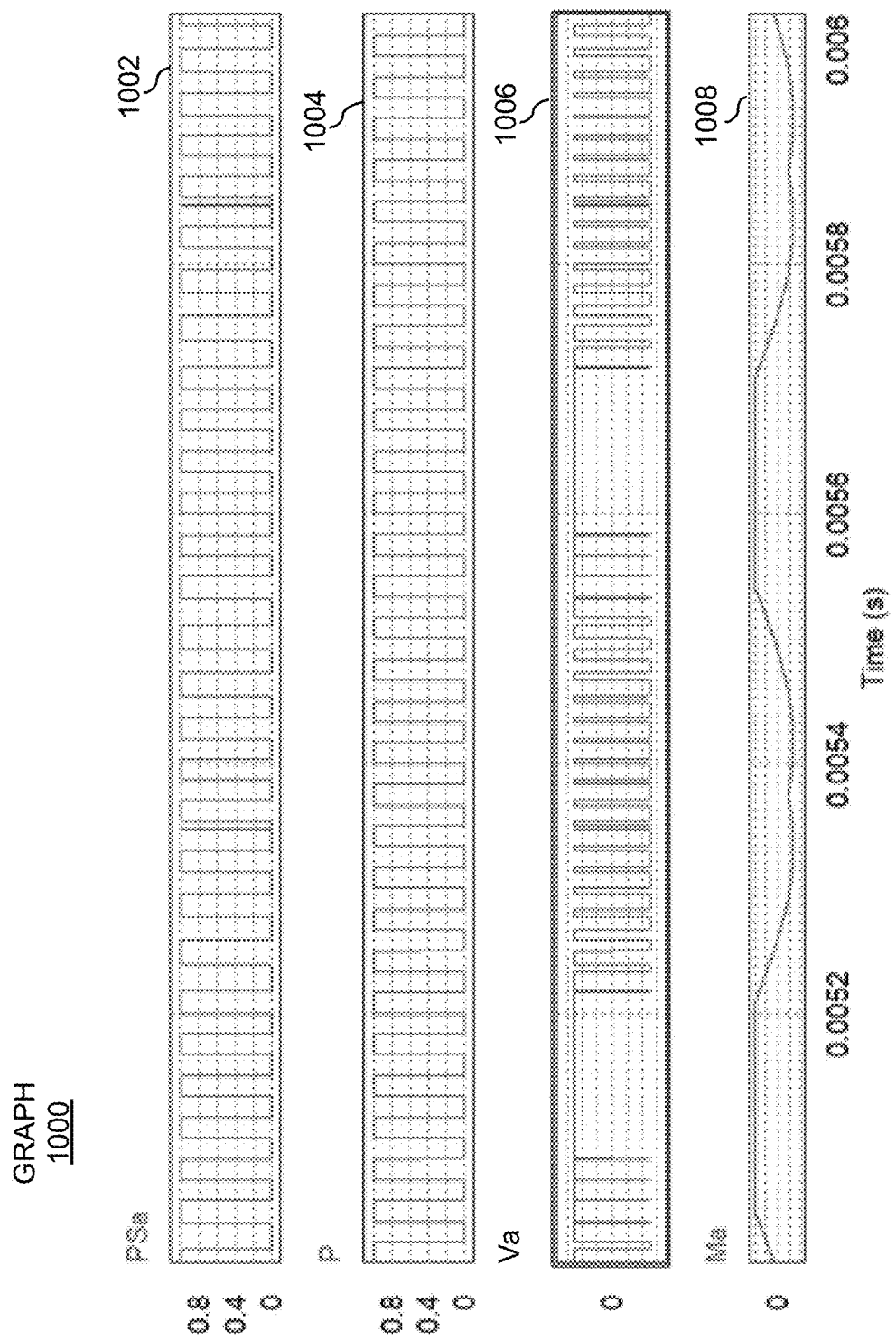
FIG. 10 depicts a graph illustrating waveforms associated with the DC side gating generator and the AC side gating logic function.

FIG. 10 depicts graph 1000 illustrating waveforms 1002-1008 associated with the DC side gating generator 306 of FIG. 8 and the AC side gating logic function 308 of FIG. 8 over the same six millisecond interval of FIG. 5 and FIG. 7 in accordance with embodiments of the present disclosure. Waveform 1002 depicts phase shifted signal PSa provided to the AC side gating logic function 308 of FIG. 8 from the bidirectional phase-shifted modulator 302 of FIG. 4. Waveform 1004 depicts the voltage polarity signal P from the DC side gating generator 306 of FIG. 8. Waveform 1006 depicts the Va signal of zero current switch circuitry 112 of FIG. 2. Waveform 1008 depicts modulation signal Ma provided to the AC side gating logic function 308 of FIG. 8 from the common offset voltage injection function 304 of FIG. 6.

Methods, devices, and systems for power conversion between a DC source and an AC power grid have been disclosed herein. The use of one of more diodes is not required for the power conversion within these methods, devices, and systems. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A power converter device comprising:
   a transformer comprising a first winding and a second winding;
   zero voltage switch circuitry over full range of load current electrically coupled to the first winding, and configured to be electrically coupled to a direct current (DC) voltage source via a first port and a second port;
   zero current switch circuitry over full range of power factor electrically coupled to the second winding, and configured to be electrically coupled with an alternating current (AC) power grid; and
   control circuitry electrically coupled with the zero voltage switch circuitry and the zero current switch circuitry, wherein the control circuitry comprises:
      a first gating generator circuit configured to provide gate voltages to the zero voltage switch circuitry; and
      a second gating generator circuit electrically coupled with the first gating generator circuit and configured to provide gate voltages to the zero current switch circuitry; and
      a bidirectional phase shifted modulator circuit electrically coupled with the second gating generator circuit, wherein the bidirectional phase shifted modulator circuit is configured for:
         receiving a current polarity signal associated with the AC power grid, a modulation signal, a lead signal, and a lag signal; and
         providing a phase shifted binary signal to the second gating generator circuit based on the current polarity signal, the modulation signal, and at least one of the lead signal, and the lag signal.

2. The power converter device of claim 1, wherein:
   the transformer further comprises:
      a first tap electrically coupled with the first winding; and
      a second tap electrically coupled with the first winding; and
   the zero voltage switch circuitry comprises:
      a first transistor switch circuit electrically coupled between the first tap and the first port;
      a second transistor switch circuit electrically coupled between the first tap and the second port;
      a first capacitor electrically coupled between the first port and the second tap; and
      a second capacitor electrically coupled between the second port and the second tap.

3. The power converter device of claim 2, wherein the AC power grid is a three-phase AC power grid and the zero current switch circuitry is further configured to be electrically coupled with the AC power grid via a third port, a fourth port, a fifth port, and a sixth port.

4. The power converter device of claim 3, wherein:
   the third port is configured to be electrically coupled with a first phase hot wire of the AC power grid;
   the fourth port is configured to be electrically coupled with a second phase hot wire of the AC power grid; and
   the fifth port is configured to be electrically coupled with a third phase hot wire of the AC power grid.

5. The power converter device of claim 4, wherein;
   the transformer further comprises:
      a third tap electrically coupled with the second winding;
      a fourth tap electrically coupled with the second winding; and
      a fifth tap electrically coupled with the second winding, wherein:
         the fifth tap is a center tap electrically coupled with the sixth port winding; and
         the sixth port is configured to be electrically coupled with an earth ground of the AC power grid; and
   the zero current switch circuitry comprises:
      a third transistor switch circuit electrically coupled between the third tap and the third port;
      a fourth transistor switch circuit electrically coupled between the third tap and the fourth port,
      a fifth transistor switch circuit electrically coupled between the third tap and the fifth port,
      a sixth transistor switch circuit electrically coupled between the fourth tap and the third port;
      a seventh transistor switch circuit electrically coupled between the fourth tap and the fourth port; and
      an eighth transistor switch circuit electrically coupled between the fourth tap and the fifth port.

6. The power converter device of claim 5, wherein the first winding and the second winding are galvanically isolated.

7. The power converter device of claim 6, wherein the transformer further comprises a third winding electrically coupled between the first tap and the second tap.

8. The power converter device of claim 7, wherein the transformer is an LLC transformer.

9. The power converter device of claim 8, wherein the first and second transistor switch circuits each comprise a high voltage (HV) silicon carbide (SiC) based N-channel metal-oxide-semiconductor field-effect transistor (MOSFET).

10. The power converter device of claim 9, wherein the third through eighth transistor switch circuits are each a multilevel circuit.

11. The power converter device of claim 10, wherein the third through eighth transistor switch circuits each comprise a plurality of HV SiC based N-channel MOSFETs forming the multilevel circuit.

12. The power converter device of claim 11 further comprising control circuitry electrically coupled with a gate of each HV SiC based N-channel MOSFET.

13. The power converter device of claim 12, wherein the control circuitry is electrically coupled with the zero voltage switch circuitry and the zero current switch circuitry.

14. The power converter device of claim 13, wherein at least a portion of the control circuitry is provided by a processor comprising program instructions.

15. The power converter device of claim 1, wherein the first gating generator circuit is further configured to provide voltage polarity information to the second gating generator circuit and to provide gate voltages to the zero voltage switch circuitry.

16. The power converter device of claim 1, wherein the DC source is a medium voltage direct current (MVDC) source.

17. The power converter device of claim 1, wherein the DC source is at least partially provided by at least one of a wind turbine, a solar panel, and a battery.

18. The power converter device of claim 1, wherein the zero current switch circuitry is configured to transfer power from the transformer to the AC power grid without requiring a diode.

19. The power converter device of claim 1, wherein the control circuitry further comprises common offset voltage injection circuitry configured for:
  receiving a control signal including frame of reference information; and
  providing the modulation signal based on the control signal including the frame of reference information.

20. A method of bidirectional power conversion between a direct current (DC) voltage source and an alternating current (AC) power grid using a power converter device comprising:
  a transformer comprising a first winding and a second winding;
  zero voltage switch circuitry over full range of load current electrically coupled to the first winding, and configured to be electrically coupled to a direct current (DC) voltage source via a first port and a second port;
  zero current switch circuitry over full range of power factor electrically coupled to the second winding, and configured to be electrically coupled with an alternating current (AC) power grid; and
  control circuitry electrically coupled with the zero voltage switch circuitry and the zero current switch circuitry, wherein the control circuitry comprises:
    a first gating generator circuit configured to provide gate voltages to the zero voltage switch circuitry; and
    a second gating generator circuit electrically coupled with the first gating generator circuit and configured to provide gate voltages to the zero current switch circuitry; and
    a bidirectional phase shifted modulator circuit electrically coupled with the second gating generator circuit;
  the method comprising:
    receiving, by the bidirectional phase shifted modulator circuit, a current polarity signal associated with the AC power grid, a modulation signal, a lead signal, and a lag signal; and
    providing, by the bidirectional phase shifted modulator circuit, a phase shifted binary signal to the second gating generator circuit based on the current polarity signal, the modulation signal, and at least one of the lead signal, and the lag signal.

* * * * *